US008586682B2

(12) United States Patent
Doyle et al.

(10) Patent No.: US 8,586,682 B2
(45) Date of Patent: Nov. 19, 2013

(54) CURING COMPOSITIONS HAVING LOW-FREE AMOUNTS OF METHYLENEDIANILINE

(75) Inventors: Thomas R. Doyle, Wallingford, CT (US); Mukund Shah, Hazlet, NJ (US); Ronald O. Rosenberg, Orange, CT (US)

(73) Assignee: Chemtura Corporation, Middlebury, CT (US)

( * ) Notice: Subject to any disclaimer, the term of this patent is extended or adjusted under 35 U.S.C. 154(b) by 143 days.

(21) Appl. No.: 12/754,944

(22) Filed: Apr. 6, 2010

(65) Prior Publication Data

US 2010/0256311 A1    Oct. 7, 2010

Related U.S. Application Data

(60) Provisional application No. 61/167,472, filed on Apr. 7, 2009.

(51) Int. Cl.
*C08G 18/10* (2006.01)

(52) U.S. Cl.
USPC . 525/453; 525/460; 252/182.13; 252/182.15; 252/182.16

(58) Field of Classification Search
USPC ............... 525/453, 460; 252/182.13, 182.15, 252/182.16
See application file for complete search history.

(56) References Cited

U.S. PATENT DOCUMENTS

| | | | |
|---|---|---|---|
| 3,876,604 A * | 4/1975 | Caruso et al. ................. 524/769 |
| 3,900,447 A * | 8/1975 | van Gulick ............. 525/440.06 |
| 4,075,150 A * | 2/1978 | Hoeschele ................... 524/871 |
| 4,247,676 A | 1/1981 | Kimball |
| 4,282,344 A | 8/1981 | Caruso |
| 4,784,201 A | 11/1988 | Palinkas et al. |
| 4,814,411 A | 3/1989 | Bethea et al. |
| 4,832,098 A | 5/1989 | Palinkas |
| 4,921,029 A | 5/1990 | Palinkas et al. |
| 4,934,425 A | 6/1990 | Gajewski et al. |
| 5,041,527 A * | 8/1991 | Riel et al. ....................... 528/353 |
| 5,605,657 A | 2/1997 | Nybakken et al. |
| 6,101,308 A | 8/2000 | Sigworth et al. |
| 6,627,682 B1 | 9/2003 | Chaves et al. |
| 2005/0256288 A1* | 11/2005 | Zhu et al. ......................... 528/44 |
| 2007/0213497 A1 | 9/2007 | Nagaraj et al. |
| 2009/0110894 A1* | 4/2009 | Nybakken et al. ............ 428/220 |
| 2010/0108215 A1* | 5/2010 | Palinkas et al. ............... 152/324 |

FOREIGN PATENT DOCUMENTS

EP     0 010 967  A1    5/1980

OTHER PUBLICATIONS

Caytur 21 Technical Data Sheet. 2007. Evidentiary reference.*
Caytor 31 DA MSDS. Chemtura. 2012. Evidentiary reference.*
Chemtura Technical Information. 2011. Evidentiary reference.*

* cited by examiner

*Primary Examiner* — Mike M Dollinger
(74) *Attorney, Agent, or Firm* — Joseph Suhadolnik; George Romanik

(57) ABSTRACT

A curing composition of a coordination complex comprising methylenedianiline (MDA) and a salt, and less than 1000 of free MDA. The curing composition may be used in curing polyurethanes and epoxy resins.

4 Claims, No Drawings

CURING COMPOSITIONS HAVING LOW-FREE AMOUNTS OF METHYLENEDIANILINE

CROSS REFERENCE TO RELATED APPLICATIONS

The present application claims priority to U.S. Provisional Application 61/167,472, filed Apr. 7, 2009, the entire contents and disclosure of which is hereby incorporated by reference.

FIELD OF THE INVENTION

The present invention relates to curing compositions having low-free amounts of methylenedianiline (MDA), processes for forming such curing compositions, and articles made from such curing compositions.

BACKGROUND OF THE INVENTION

Polyurethanes and epoxy resins are versatile materials that find use as elastomers, coatings, encapsulating agents and composite matrices. Curing compositions having amines, such as aliphatic or aromatic amines, are widely used to cure epoxy or isocyanato-terminated prepolymers to form such epoxy resins and polyurethanes. Conventional amine curing compositions are described in U.S. Pat. Nos. 3,876,604; 4,075,150; and 4,282,344, the entire contents and disclosures of which are hereby incorporated by reference.

One type of amine curing composition is derived from aromatic amine compounds. The aromatic amine curatives currently available provide good materials for many applications, but suffer from several problems. One problem associated with the common aromatic diamines, when used as a curing composition for either epoxy or isocyanato-terminated prepolymers, relates to their hygienic considerations in the workplace. Many single ring and double ring diamines, such as methylenedianiline (MDA), are toxic or carcinogenic. Thus, these amines are regulated and the amounts of aromatic amines must be controlled to limit the toxic effect.

Aliphatic amines have also been used in the past for curing epoxy or isocyanato-terminated prepolymers. While it is known that aliphatic amines provide accelerated reaction rates compared to aromatic amines, aliphatic amines also have problems. For example, cycloaliphatic curatives permit rapid low temperature curing but leave residual NH functionality in the cured product that reacts with ambient carbon dioxide to form surface carbamates. These carbamates lead to water spotting and poor interfacial adhesion and, as a result, the product may be unsuited for subsequent coating and composite applications. In addition, the rapid curing of cycloaliphatic polyamines results in incomplete incorporation of the curative into the final product resulting in degradation of surface and interfacial properties. Thus, while aliphatic amines provide low temperature curing and reduced toxicity as compared to aromatic amines, the above-identified problems limit the use of aliphatic amines.

Thus, the need exists for an effective curing composition that improves the properties of the epoxy or isocyanato-terminated prepolymers without the processing and physical problems of currently available aliphatic amines or the toxicity problems of aromatic amines.

BRIEF SUMMARY OF THE INVENTION

In a first aspect of the present invention, there is provided a curing composition comprising a coordination complex of 4,4'-methylenedianiline and a salt and less than 1000 wppm of free methylenedianiline, preferably 4,4'-methylenedianiline. In terms of ranges the amount of free MDA may range from 50 wppm to 950 wppm. In one embodiment, the curing composition has a Brookfield viscosity of from 50 to 7,500 cP, e.g., from 50 to 2,500 cP at 30° C. The curing composition may also comprise additional plasticizers, surfactants, and other additives.

In a second aspect of the present invention, there is provided a polyurethane article, the article being a reaction product of (a) a polyurethane prepolymer mixture; and (b) a curing composition comprising: i) a coordination complex of 4,4'-methylenedianiline and a salt; and ii) less than 1000 wppm of free methylenedianiline.

In a third aspect of the present invention, there is provided a process for preparing a curing composition, comprising: (a) forming a mixture of methylenedianiline, having a 4,4'-methylenedianiline isomer content of greater than 99.0%, and an alkali metal salt in the presence of a liquid plasticizer; (b) drying the mixture of water; and (c) reducing free methylenedianiline by adding an isocyanate to the dried mixture, wherein no surfactants are added during or after the reduction of the free methylenedianiline wherein the curing composition has less than 1000 wppm of free methylenedianiline.

DETAILED DESCRIPTION OF THE INVENTION

In one embodiment, the present invention is directed to curing compositions of a coordination complex that forms between 4,4'-methylenedianiline (4,4'-MDA) and a salt, which is preferably dispersed in a plasticizer and the curing composition has a low-free amount of methylenedianiline (MDA). The "low-free" or "free" amount of MDA refers to the MDA that is not complexed with the salt, and remains free in the curing composition. The free MDA amount of a curing composition may be determined by separating the salt-MDA complex particles from the liquid phase by a high speed centrifuge and analyzing the liquid phase for MDA content by potentiometric titration.

Commercially available grades of MDA are typically a mixture of amines. The mixture often includes 4,4'-MDA, 2,4'-MDA, 2,2'-MDA, and N-methyl-4,4'-MDA, and other amines. The use of the acronym MDA without a prefix refers to all amine containing components in commercial grades of MDA. The coordination complex is formed between the 4,4'-MDA isomer and the salt. The other MDA components in the curing composition are generally not capable of complex formation and remain in the liquid phase along with residual free 4,4'-MDA. Commercial grades of MDA typically contain about 97 wt % to 99 wt %, of 4,4'-MDA, with the remainder being at least one of the other amine compounds and/or isomers thereof. In one embodiment, the present invention is directed to a process that uses a higher purity grade of MDA that has a 4,4'-MDA content of at least 99 wt %, e.g., at least 99.1 wt % or at least 99.5 wt %. The use of the higher grade of MDA, optionally in combination with processing steps described herein, beneficially reduces the amount of free MDA in the curing composition and allows the production of a curing composition with low-free amounts of MDA.

The curing composition comprises a coordination complex of 4,4'-MDA and a salt, referred to herein as the "4,4'-MDA complex," and a low-free amount of MDA. The 4,4'-MDA complex is present in the curing composition in an amount ranging from 10 wt % to 90 wt % based on the total weight of the curing composition, e.g., from 30 to 70 wt % or from 40 to 60 wt %. The amount of free MDA in the curing composition may vary but typically is less than 1000 wppm, e.g., less than 800 wppm or less than 500 wppm. In terms of ranges the amount of free MDA is from 0 wppm to 1000 wppm, e.g., 50 wppm to 950 wppm, 100 wppm to 800 wppm, or from 200 to 500 wppm. In one preferred embodiment, the free 4,4'-MDA, in the curing composition is less than 1000 wppm, e.g., less than 800 wppm or less than 500 wppm. In terms of ranges the amount of free 4,4'-MDA is from 0 wppm to 1000 wppm, e.g., 50 wppm to 950 wppm, 100 wppm to 800 wppm, or from 200 to 500 wppm. Curing compositions having low-free amount of MDA, preferably low-free amounts of 4,4'-MDA, surprisingly and unexpectedly demonstrate improved physical properties in the elastomers that may be formed therewith.

In one embodiment, the MDA complexes are complexes of approximately three equivalents of MDA for every equivalent of an alkali metal salt, such as sodium chloride, sodium bromide, sodium iodide, lithium chloride, lithium bromide, lithium iodide, and sodium cyanide. The alkali metal salt is preferably sodium chloride or sodium bromide. The MDA complex particles preferably have an average particle size of from 1 to 60 µm, e.g., from 5 to 35 µm or from 10 to 15 µm. In one embodiment, at least 90% of the particles have an average particle size of less than 60 µm, e.g., less than 45 µm, or less than 30 µm. The average particle sizes of MDA complex particles can be determined, for example, by means of a photomicrograph in a known manner.

The curing composition may also comprise a plasticizer in an amount of from 10 to 90 wt %, based on the total weight of the curing composition, e.g., from 30 to 70 wt %, or from 40 to 60 wt %. For example, many plasticizers listed in Plastics Additives and Modifiers Handbook, edited by Jesse Edenbaum, Van Nostrand Reinhold (1992) pp 359 to 489, may be used. The entire contents and disclosure of this document are hereby incorporated by reference. Suitable plasticizers may include, but are not limited to (1) esters of polycarboxylic acids and monohydric alcohols or phenols, (2) esters of polyols and monocarboxylic acids, (3) triesters of phosphoric acid alkyl phthalates and (4) aromatic hydrocarbons. Preferred plasticizers include di(2-ethylhexyl) phthalate, diisodecyl phthalate, di(2-ethylhexyl) adipate and diisodecyl adipate.

In one embodiment, the curing composition further comprises one or more surfactants, for example, in an amount of from 0.1 to 5.0 wt %, e.g., from 0.5 to 3.0 wt % or from 1.0 to 2.0 wt %, based on the total weight of the curing composition. For example, many surfactants listed in Kirk-Othmer Encyclopedia of Chemical Technology, volume 24, pp 118 to 161, Wiley Interscience (2007), may be used. The entire contents and disclosure of this document are hereby incorporated by reference. Suitable surfactants include, but are not limited to anionic, cationic, and nonionic surfactants. Preferred surfactants include oil-soluble surfactants, lecithin, and quaternary ammonium compounds. The curing composition may further comprise one or more additional additives, such as, for example, pigments, fillers, solvents, stabilizers, anti-settling agents, and pore-forming agents. These one or more additional additives, when present, may be in an amount of from 0.1 to 20 wt %, e.g., from 0.5 to 15 wt %, or from 1.0 to 10 wt %.

In various embodiments, the curing composition of the present invention possesses one or more of the following processing characteristics. These characteristics are useful in preparing articles and may improve the efficiency in the processing of such articles. The solid content of the curing composition, for example, optionally is from 10 to 90 vol. %, e.g., from 30 to 70 vol. % or from 40 to 60 vol. %. The curing composition optionally comprises amino nitrogen in an amount of from 1.3 to 11.6%, e.g., from 3.9 to 9.0% or from 5.1 to 7.7%. The Brookfield viscosity of the curing composition preferably is from 50 to 7,500 centipoise (cP; mPa·s) at 30° C., e.g., from 100 to 4,000 cP, from 200 to 3,000 cP, or from 200 to 2,500 cP. In one embodiment, the Brookfield viscosity is less than 2,500 cP, e.g, less than 2,000 cP, or less than 1,500 cP. Viscosity may be measured using a Brookfield viscometer, model # RVDV-II with a Thermosel™ system using a #21 spindle at 30° C. and 10 rpm. In addition, the curing compositions of the present invention, after being dried, preferably have a low water content. For example, the curing composition optionally comprises water in an amount less than 1200 wppm, e.g., less than 1000 wppm or less than 800 wppm. In terms of ranges, the curing composition optionally comprises water in an amount of from 10 to 3000 wppm, e.g., from 10 to 1500 wppm or from 10 to 800 wppm. Embodied curing compositions of the present invention possess at least one of these characteristics and most preferably possess at least three of these characteristics. For example, one such curing composition may have a solid content of at least 40%, Brookfield viscosity less than 4000 cP at 30° C. and a water content of less than 800 wppm.

In one embodiment of the present invention, the curing compositions having a low-free amount of MDA may be prepared under the following conditions. In general the process involves a wet stage for forming the coordination complex, a drying stage, and a scavenging stage to reduce and/or remove MDA to form the final product, e.g., the curing compositions having a low-free amount of MDA.

In the wet stage, an initial MDA and alkali metal salt are added separately to a reaction zone, preferably an agitating device, in the presence of one or more plasticizers, surfactants, and brine or water. In one embodiment, the initial MDA used to form the curing composition is a substantially pure MDA. Substantially pure 4,4'-MDA comprises 99.0 wt % or more of 4,4'-MDA, e.g., 99.3 wt % or more of 4,4'-MDA or 99.5 wt % or more of 4,4'-MDA. In terms of ranges, the substantially pure MDA comprises from 99.0 to 99.99% of 4,4'-MDA, e.g., from 99.1 to 99.99 wt %, or from 99.2 to 99.99 wt %. The substantially pure 4,4'-MDA also comprises less than 1.0 wt % of non-4,4'-MDA components, such as 2,2'-MDA, 2,4'-MDA and N-methyl-4,4'-MDA, e.g., less than 0.5 wt %, less than 0.2 wt %, less than 0.1 wt %, or less than 0.05 wt %. In terms of ranges the amount of isomeric MDA impurities in the initial MDA is from 0.01 to 0.9 wt %, e.g., 0.01 to 0.5 wt %, or 0.01 to 0.2 wt %. Starting with a substantially pure 4,4'-MDA allows the processes of the present invention to further reduce the amount of free MDA in the final product.

The alkali metal salts added in the wet stage preferably are selected from the group consisting of sodium chloride, sodium bromide, sodium iodide, lithium chloride, lithium bromide, lithium iodide, and sodium cyanide.

The 4,4'-MDA and the alkali metal salt react in a three to one mole ratio, respectively, to form the coordination complex. It is preferable to use an excess of metal salt to reduce the amount of residual 4,4'-MDA in the product. The equivalent ratio is preferably greater than 1.05 equivalents of sodium chloride to 1.0 equivalents of 4,4'-MDA.

Brine or water may be used in some embodiments of the present invention. While water is required for complex formation to proceed, the quantity employed is preferably limited as indicated to produce particles of complex in the desired size range. The amount of brine or water present in the agitating device may range from 0.5 to 20 parts by weight of the wet stage formulation. e.g., from 0.8 to 10 parts per parts of the wet stage formulation, or from 1 to 5 parts of the wet stage formulation.

In one embodiment, there may be an inert liquid carrier or vehicle, such as a plasticizer, present in the reaction zone. In this way the particles are dispersed within the inert vehicle liquid when formed and a dispersion is directly formed that can be used conveniently as a curing composition. Generally, the plasticizers do not promote the decomposition of the complex and are unreactive toward the polymer that is to be cured with the final curing composition. Suitable plasticizers include: (1) esters of polycarboxylic acids and monohydric alcohols or phenols, (2) esters of polyols and monocarboxylic acids, (3) triesters of phosphoric acid and (4) aromatic hydrocarbons. Preferred plasticizers include di(2-ethylhexyl) phthalate, diisodecyl phthalate, di(2-ethylhexyl) adipate and diisodecyl adipate. The amount of plasticizer, if used during the wet stage, present in the agitating device may range from 10 to 90 wt % of the wet stage formulation, e.g., from 30 to 70 wt % of the wet stage formulation, or from 40 to 60 wt % of the wet stage formulation.

The surfactants present in the wet stage preferably are selected from the group consisting of lecithin, polyoxypropylated quaternary ammonium halides, phosphated glycerides, and the like. The amount of surfactant, if used during the wet stage, present in the agitating device may range from 0.1 to 5 wt % e.g., from 0.5 to 3 parts per each part of salt, or from 1.0 to 2.0 wt %.

In the wet stage, the complex formation between the MDA and alkali metal salts occurs. Temperatures of 80° C. or less may be used to assist the dissolution of the MDA particles and reduce the viscosity of the reaction medium. In one embodiment, the temperature may range from 0° C. to 80° C., e.g., from 10° C. to 70° C. or from 20° C. to 60° C. In one embodiment, pressure has no substantial effect on the progress of the reaction in the wet stage. The reaction in the wet stage requires agitation sufficient to keep changing the interface of the reaction medium. Suitable mixing devices include high shear homogenizers and blenders. The wet stage continues until the solid particles of MDA are consumed by the alkali salt. The reaction time depends on the type of plasticizer and reaction temperature. At the completion of the reaction cycle, the material is termed the wet stage intermediate. The wet stage intermediate may be optionally transferred to another device for water stripping.

Water is removed from the wet stage intermediate using, for example, vacuum distillation preferably at a temperature of 30-80° C., e.g., 40-70° C., or 50-60° C. and a pressure of 1 to 50 mbar, e.g. 1 to 25 mbar or 1 to 10 mbar. The water may be completely removed or if present the water may be substantially removed. The water present in the resulting dispersion after removal should be less than 3000 wppm, e.g., less than 1500 wppm or less than 800 wppm. In terms of ranges, the amount of water may be from 10 wppm to 3000 wppm, e.g., 10 wppm to 1500 wppm, or from 10 wppm to 800 wppm. At the completion of the water distillation step the dry stage intermediate may be optionally transferred to another device for finishing.

The dry stage intermediate is preferably finished by adding one or more plasticizers, surfactants, and amine scavengers with mixing. The plasticizers and surfactants used in the dry stage may be similar to those used during the wet stage. In one embodiment, the plasticizer added in the dry stage is the same as the plasticizer added in the wet stage. The amount of plasticizer added to the dry stage is from 0.1 to 20 parts per weight for each part of the dispersion, e.g., from 0.5 to 10 parts per each part of the dispersion, or from 1 to 5 parts per each part of the dispersion. In one embodiment, the surfactants used in the dry stage may comprise one or more surfactants, present in an amount of from 0.01 to 4.0 parts per weight for each part of the dispersion, e.g., from 0.05 to 2.0 parts per each part of the dispersion, or from 0.1 to 1.0 parts per each part of the dispersion.

In one embodiment, during the finishing step there is an amine reduction step that uses scavengers, such isocyanates, to react with free MDA in the dispersion. The plasticizers and surfactants may also be during the finishing step, and may be similar to those used during either the wet stage or drying stage. The temperature during the amine isocyanate reaction is below 60° C., below 55° C., or below 50° C. In terms of ranges the temperature in the dry stage is from 0 to 60° C., e.g., from 10 to 55° C., or from 20 to 50° C. Reduced pressure, of 2 mm to 760 mm, may also be used during the amine isocyanate reaction. The reaction mixture is agitated for 0.5 to 8 hours, e.g., 1 to 6 hours or 2 to 4 hours. Representative isocyanates include phenyl isocyanate, p-tolyl isocyanate, cyclohexyl isocyanate, butyl isocyanate, tolylene-2,4-diisocyanate (TDI) and its mixtures with tolylene-2,6-diisocyanate, 4,4'-methylenebis(phenyl isocyanate) (MDI), 2,4,4'-triisocyanato-diphenyl ether, phenylene-1,4-diisocyanate, 4,4'-methylenebis(cyclohexyl isocyanate) ($H_{12}MDI$), paraphenylene diisocyanate (PPDI), 1,6-hexane diisocyanate (HDI), isophorone diisocyanate (IPDI), 3,3'-bitoluene diisocyanate (TODI), 1,4-cyclohexyl diisocyanate (CHDI), naphthalene-1,5-diisocyanate (NDI) and mixtures thereof. In one embodiment, the scavenger may be a 80/20 mixture of 2,4-/2,6-TDI. Preferably, the scavengers react with the free MDA and remain in the curing composition, but in some embodiment the reacted scavengers may be partially or completely separated from the curing composition.

In one embodiment, the isocyanate scavengers are added in an amount of at least, at least 0.5 equivalents, e.g., at least 1 equivalents, or at least 2.0 equivalents, of the isocyanate scavengers are added per equivalent of free amine groups in the dispersion.

One result of the amine reduction step is that the viscosity of the final dispersion increases. Viscosity of a tris (4,4'-methylenedianiline) sodium chloride curing composition is strongly dependent on the $NCO/NH_2$ equivalent ratio and the free MDA level. An increase in the $NCO/NH_2$ equivalent ratio at constant MDA level increases viscosity. An increase in the free MDA level at constant $NCO/NH_2$ ratio increases viscosity. In one embodiment of the present invention, this increase in viscosity is less significant due to the high 4,4'-MDA content of the initial MDA. The use of MDA with a high 4,4'-MDA content results in less 2,4'-MDA, 2,2'-MDA or N-methyl-4,4'-MDA in the dispersion, since only 4,4'-MDA reacts to form the coordination complex. Unlike the complexing reaction, the isocyanate is not selective and reacts with all the free amines in the dispersion.

Following the amine reduction, additional pigments, surfactants, fillers, solvents, stabilizers, anti-settling agents, and pore-forming agents may optionally be added to the resulting dispersion. The amount of such components may be any amount of from 0.1 to 20 wt % of the final product, e.g., from 0.5 to 15 wt %, or from 1.0 to 10 wt %. The final product is a curing composition having a low-free MDA.

In one embodiment, dry stage intermediate may be finished by adding one or more plasticizers and amine scavengers, without the addition of surfactants. Although surfactants may be added before adding the amine scavengers, e.g. during the wet or dry stage, no surfactants are added after the dry stage. Previous methods, such as those described in U.S. Pat. No. 4,282,344, state that the failure to add surfactants after the dry stage results in the composition setting to an undesirable paste that is impractical to use. It is surprising and unexpected that using a higher grade of MDA as a starting material allows the curing composition to be finished in the absence of surfactants while still producing a curing composition having a low viscosity and low-free amount of MDA.

In one embodiment, the curing compositions of the present invention may be used to cure polyurethane prepolymer mixtures to form cured polyurethane articles. As employed herein, the term "polyurethane prepolymer mixture" or "prepolymer mixture" means the reaction product of at least one polyol with a diisocyanate monomer, i.e., a polyurethane prepolymer. Polyols may have from 1 to 4 OH groups per molecule, preferably from 1.5 to 3, e.g. about 2. Polyurethane prepolymer mixtures may be obtained by reacting one or more polyols with one or more diisocyanate monomers by procedures known in the art. In one embodiment, the prepolymer is made by reacting the polyol with a large excess of diisocyanate monomer, at an initial diisocyanate:polyol molar ratio greater than 2:1, e.g., greater than 4:1 or greater than 7:1. The polyurethane prepolymer mixtures may be prepared from diisocyanate monomer and a polyol component at a maximum temperature ranging from 30° C. to 130° C., e.g., from 50° C. to 110° C. In one embodiment, the reaction is carried out at a maximum temperature ranging from 50° C. to 110° C. with agitation.

The polyurethane prepolymer mixture may comprise adducts having a "diisocyanate-polyol-diisocyanate" structure (here termed "ABA" structure, where A denotes diisocyanate and B denotes the polyol), or higher molecular weight adducts that contain two or more polyol moieties (here termed "oligomers" of structure "ABABA," "ABABABA," etc.). In one embodiment, when excess starting amounts of A are used, the formation of ABA structure may be favored over oligomers of structure ABABA or ABABABA. In general, the formation of oligomers of structure ABABA or ABABABA are less favored.

Each ABA and ABABA adduct has two unreacted NCO groups, one on each of the terminal A moieties. The internal A moiety in the ABABA adduct has no remaining unreacted NCO group. Therefore, the ABABA adduct has a lower weight percentage NCO content than does the ABA adduct. Certain larger amounts of unreacted A, free diisocyanate, may be undesirable because the free diisocyanate tends to create toxic atmospheric fumes in handling. Thus, in a polyurethane prepolymer mixture with a low content of unreacted A, the relative content of ABA to higher molecular weight adducts can be determined by the percent NCO content of the mixture. A large molar excess of diisocyanate over the polyol minimizes oligomer formation. A diisocyanate:polyol molar ratio of at least about 5:1 or greater favors formation of a prepolymer mixture (after removal of any solvent and free diisocyanate monomer) having an NCO content that is at least about 80% of the theoretical NCO content for a pure ABA structure.

As an illustration, consider a polyol of number average molecular weight (mw) of 1000 and a diisocyanate having mw of 250. Thus, the ABA adduct would have an mw of 250+1000+250, or 1500. The ABA adduct would also have two NCO end groups, of 42 daltons each. Thus, the theoretical NCO content would be 2(42)/1500=5.6% by weight for the ABA structure. By a similar calculation, it is seen that the ABABA structure would have a theoretical NCO content of 2(42)/2750=3.05% by weight. For comparison, pure MDI monomer itself has about 33.6% NCO content.

The diisocyanate component may include, for example, diphenylmethane diisocyanate (MDI), toluene diisocyanate (TDI), para-phenylene diisocyanate (PPDI), 1,6-hexane diisocyanate (HDI), isophorone diisocyanate (IPDI), 3,3'-bitoluene diisocyanate (TODI), 1,4-cyclohexyl diisocyanate (CHDI), naphthalene-1,5-diisocyanate (NDI), methylene bis (p-cyclohexyl isocyanate) ($H_{12}$MDI), and mixtures thereof. In one embodiment, MDI and/or TDI are used as the isocyanate component. The prepolymer mixture may further comprise 0.01-10.0 wt %, e.g., 0.1-5.0 wt % or 0.5-3.0 wt %, of free diisocyanate component, which is not reacted with the polyol.

The polyol component optionally includes a polycaprolactone, a polyether, a polyester, a polycarbonate, or mixtures thereof. In various embodiments, the polyol may comprise one or more of a polyether, a polyester, a polycarbonate, or a polycaprolactone, preferably having a molecular weight ranging from 200 to 6000, e.g., from 400 to 3000 or from 1000 to 2500. In this context, molecular weight refers to the number average molecular weight in Daltons. Such polyols may include, for example, polyester of adipic acid, polyether of ethylene oxide, polyether of propylene oxide, polyether of tetrahydrofuran, polyether of 1,3-propanediol, polycaprolactone (PCL), polycarbonate, copolymers and terpolymers formed from the above, and mixtures thereof. In various optional embodiments, the polyol comprises glycols or triols having molecular weights ranging, for example, from 60 to 400, e.g., from 80 to 300 or from 100 to 200. Such glycols or triols may include, for example, ethylene glycol, isomers of propylene glycol, isomers of butane diol, isomers of pentanediol, isomers of hexanediol, trimethylolpropane, pentaerythritol, poly(tetramethylene ether) glycol, poly(trimethylene ether) glycol (e.g. Cerenol polyols, DuPont), diethylene glycol, triethylene glycol, dipropylene glycol, tripropylene glycol, and mixtures thereof.

Suitable polyester polyols include poly(adipate) glycol, poly(hexamethylene adipate) glycol, poly(ethylene adipate) glycol, poly(diethylene adipate) glycol, poly(ethylene/propylene adipate) glycol, poly(trimethylolpropane/hexamethylene adipate) glycol, poly(ethylene/butylene adipate) glycol, poly(butylene adipate) glycol, poly(hexamethylene/neopentyl adipate) glycol, poly(butylene/hexamethylene adipate) glycol (PBHAG), poly(neopentyl adipate) glycol, and mixtures, copolymers and terpolymers thereof.

Representative polyols include polypropylene glycol (PPG) such as Acclaim 4220 (mw=4037, Bayer MaterialScience), PPG diol polymer from propylene oxide (PPG 4000), Acclaim 3201 (mw=3074, Bayer MaterialScience), PPG-EO diol (copolymer from propylene oxide and ethylene oxide) (PPG-EO 3000), Arcol R-2744 (mw=2240, Bayer MaterialScience), PPG diol (PPG 2000), poly(ethylene adipate) glycol (PEAG) such as PEAG 1000 (mw=980, Chemtura Corporation), PEAG 2000 (mw=1990, Chemtura Corporation), and PEAG 2500 (mw=2592, Bayer MaterialScience), poly(trimethylolpropane ethylene adipate) glycol (PTEAG), poly(tetramethylene ether) glycol (PTMEG or PTMG), such as Terathane™ 1000 (mw=994, Invista), Terathane™ 2000 (mw=2040, Invista), tripropylene glycol (mw=192, Aldrich Chemical Company, Inc.), and diethylene glycol (mw=106, Aldrich Chemical).

Suitable polyurethane prepolymer mixtures formed from various diisocyanates and various polyols are described in U.S. Pat. Nos. 4,832,098, 4,934,425, 4,921,029, 4,784,201, and 5,605,657, and U.S. application Ser. No. 09/919,994, filed on Aug. 2, 2001, the entire contents and disclosures of which are hereby incorporated by reference. Examples of polyurethane prepolymer mixtures include, but are not limited to, Adiprene™ and Vibrathane™ prepolymer mixtures are made by Chemtura Corporation. In particular the Adiprene™ L series (TDI-polyol), Adiprene™ LF series (LF TDI-polyol) and Adiprene™ LFM series (LFMDI-polyol), and Adiprene LFP series (LFPPDI-polyol).

A prepolymer mixture may be easily chain-extended by mixing the prepolymer mixture with a curing composition of the present invention at moderate processing temperatures to form a pre-elastomer mixture. Once formed, the pre-elastomer mixture is heated to a curing temperature. The curing temperature employed for curing the pre-elastomer mixture may vary, but will typically be greater than 40° C., e.g., greater than 70° C. or greater than 90° C. In terms of ranges, the curing temperature optionally is from 20° C. to 160° C., e.g., from 90° C. to 150° C. or from 100° C. to 125° C. The molar ratio of prepolymer mixture to curing composition, for example, may be in the range of from 0.5:1 to 1.5:1, e.g., from 0.7:1 to 1.2:1 or from 1.1:1 to 0.95:1. The amount of curing composition may also be calculated by the following formula:

$$C_{100p} = \frac{(NCO \%)(C_{ew})(\% \text{ Theory})}{4202}$$

where $C_{100p}$ is the parts curing composition per 100 parts prepolymer mixture, NCO % is percent of NCO content of the prepolymer mixture, $C_{ew}$ is the equivalent weight of the curing composition, and % Theory is the stoichiometry for the curing composition. Thus, for example, the calculated amount of a curing composition with an equivalent weight of 267 and 95% stoichiometry cured with a prepolymer mixture having 4.1 NCO % would be 24.8 parts of curing composition per 100 parts prepolymer mixture on a mass basis.

At room temperature the curing compositions of the present invention react very slowly with terminal isocyanate groups. However at 100° C.-150° C., the MDA complex unblocks and the resulting MDA reacts rapidly with the prepolymer mixture to form the polyurethane article. Such curing compositions of the present invention yield articles with similar or superior properties compared to articles cured with other curatives, such as 4,4'-methylene-bis(2-chloroaniline) (MBCA). For example, the curing compositions of the present invention may be used to form articles having a Shore hardness of from 40A to 80D, e.g., from 50A-75D or from 60A-65D, depending on the prepolymer mixture employed.

One advantage of using MDA blocked with a salt in a curing composition, is that once de-blocked, the salt does not need to be separated from the cured polyurethane article. In other words, properties of the article are generally unaffected by the presence of the salt.

In one embodiment of the invention, the process of curing the prepolymer mixture with a curing composition of the present invention may be done using a cool technique. A cool technique involves pouring the pre-elastomer mixture, which is at a temperature of 50° C. or less, into a mold that is at a temperature of 50° C. or less, e.g., less than 40° C. or less than 30° C. Once the mold is filled, the temperature is increased, for example to a temperature of 120° C., in order to de-block the MDA complex and initiate the cure. The rate at which the temperature of the mold should increase may vary.

Deblocking an MDA-salt complex is a sensitive process and, without being bound by theory, higher levels of free diisocyanate are believed to inhibit de-blocking. Once the de-blocking temperature is reached and the MDA complex is inhibited from de-blocking, then the MDA complex will not de-block to produce an article having suitable physical properties regardless of the time or temperature of cure. It should be noted that such inhibited de-blocking may cure to form a polymer with less desirable physical properties. Generally, the MDA complex has one opportunity to de-block and, if missed, the resulting product will have unsuitable physical properties for high performance applications.

In one embodiment, the curing compositions of the present invention may be used to cure epoxy resins. The composition may comprise from 35 to 99.5 wt % of an epoxy resin, e.g., from 40 to 95 wt % or from 45 to 90 wt %. The curing composition of the present invention may be present in an amount of from 0.5 to 65 wt % based on the total weight, e.g., from 5 to 60 wt %, or from 10 to 55 wt %. In one embodiment, the curing compositions may be present in an amount of from 0.1 to 4.0 chemical equivalents of amine to the epoxide, e.g., from 0.50 to 2.0 equivalents for each equivalent of epoxide or from 0.60 to 1.5 equivalents for each equivalent of epoxide.

In one embodiment, the curing temperature is from 40° C. to 250° C., e.g., from 50° C. to 200° C. or from 75° C. to 150° C.

Suitable epoxy resins include 1,2-butadiene diepoxide, 1,4-butanediol diglycidyl ether, diepoxycyclooctane, 2,2-dimethyl-1,3-propanediol diglycidyl ether, ethylene glycol diglycidyl ether, and diglycidyl ether of bisphenol-A, alpha, omega-diglycidyl polyethylene oxide, and alpha, omega-diglycidoxypropyl polydimethylsiloxane, and mixtures thereof. Other epoxy resins are glycidyl ethers of polyhydric phenols, of aliphatic or cycloaliphatic alcohols, such as bisphenol A, bisphenol F, resorcinol, dihydroxydiphenyl, 4,4'-dihydroxydiphenyl sulfone, dihydroxynaphthalene, and condensation products of phenols or cresols with formaldehyde. Other epoxy resins include glycidyl ethers of halogenated mono-, di- or polynuclear phenols; glycidylated amines, aminophenols and amides; glycidylated polyacids; and cycloaliphatic epoxy resins having epoxy groups attached to cyclohexane or cyclopentane rings. Mixture of polyepoxides as described above and mixtures of polyepoxides with monoepoxides may also be used. Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol. In one embodiment the epoxy resins have on average more than one epoxy group per molecule.

Suitable polyurethane prepolymer mixtures are described in U.S. Pat. Nos. 6,627,682, and 6,101,308, the entire contents and disclosures of which are hereby incorporated by reference.

Additional components may be added to the epoxy resin, such as reactive diluents, reactive flexibilizers, and nonreactive extenders.

Epoxy resins are useful in the production of composites, adhesives, molding compounds, potting compounds, coatings and wide variety of other utilities for which epoxy resins are widely used. These utilities include, but are not limited to, an encapsulating material to encapsulate semiconductor devices, matrix resins for aerospace composites, protective coatings and laminates, adhesives for applications where high strength bonds are required, molds and casting for industrial tooling applications.

The curing compositions of the present invention may also be utilized for the curing of amine-curable prepolymers or polymers include the following:

1. The curing or cross-linking of halogen-containing hydrocarbon polymers such as chloroprene polymers, chlorinated butyl rubber and chlorinated polyethylene and polypropylene, and hydrofluorinated polymers.

2. The curing or cross-linking of chlorosulfonated polymers.

3. The curing or cross-linking of polymers containing acid halide groups and haloformate groups.

4. The curing or cross-linking of polymers containing anhydride groups which on reaction with diamines yield amide-acid linkages.

5. The curing or cross-linking of organopolysiloxanes.

All patents and articles referred to above are herein incorporated by reference.

The advantages and the important features of the invention will be more apparent from the following examples.

EXAMPLES

The following examples illustrate the invention. Amino nitrogen was measured by potentiometric titration with perchloric acid. Free MDA was determined by separating the complex particles from the liquid phase using a high speed centrifuge and analyzing the liquid phase for free MDA content by potentiometric titration with perchloric acid. Viscosity was measured using a Brookfield viscometer, model #RVDV-II with a Thermosel™ system using a #21 spindle at 30° C.

Comparative Example A

The following example is repeated from Example 1 of U.S. Pat. No. 4,282,344.

A dispersion of 4,4'-methylenedianiline/sodium chloride complex was prepared by: (1) forming a mixture of 225 g of di(2-ethylhexyl) phthalate (DOP), 19.5 g of sodium chloride, 64 g of water, 1.48 g of lecithin, 7.52 g of a polyoxypropylated quaternary ammonium chloride; (2) while the resulting mixture was agitated 198 g of methylenedianiline (4,4'-MDA purity content=98.38%) was added; (3) continuing the mixing of the composition at 60° C. until the solid particles of methylenedianiline are consumed; and (4) removing water from the resulting dispersion of complex particles in the organic liquid by distillation in an agitated vessel at 60° C. under reduced pressure. The material produced at the end of step 4 is the dry stage intermediate.

A curing composition is prepared by performing the following additional steps: (5) adding 2.3 parts of an 80/20 mixture of 2,4/2,6-toluene diisocyanate with agitation. The free flowing mixture rapidly turned into a paste, and (6) adding 1.0 part of lecithin to 102.3 parts of the paste formed in step (5), which was blended into the paste using a speed mixer. The results are shown in Table 1 along with the reported data from Example 1 of U.S. Pat. No. 4,282,344.

TABLE 1

|  | Reported Example 1 U.S. Pat. No. 4,282,344 | Comparative Example A |
|---|---|---|
| Dry Stage Intermediate | | |
| Calculated AN (%) | 6.196 | 6.196 |
| Measured AN (%) | Not Reported | 6.187 |
| Free MDA (%) | 2.25 | 2.039 |
| Viscosity (cP) | Not Reported | 2230 |
| Curing Composition | | |
| Calculated AN w/o DOP (%)[A] | 5.624 | 5.624 |
| Calculated AN w DOP (%) | 4.994[A] | DOP not added |
| Calc. AN from Example 2 | 5.67[B] | — |

TABLE 1-continued

|  | Reported Example 1 U.S. Pat. No. 4,282,344 | Comparative Example A |
|---|---|---|
| Measured AN (%) | 6.1[A] | 5.739 |
| Viscosity (cP) | 4200 | Paste |
| Free MDA (%) | Not Reported[C] | Paste[D] |

[A]U.S. Patent 4,282,344, Example 1, step (5) reports that TDI-80 was added as a 15% solution in DOP. Amino nitrogen calculations were done with and without the added DOP and are listed in Table 1. These calculations show the reported amino nitrogen value of 6.1% to be much higher than the amino nitrogen value of 4.99% calculated with the addition of DOP in step (5) of Example 1 in U.S. Pat. No. 4,282,344.
[B]The curing composition prepared was used to cure a prepolymer in Example 2 of U.S. Pat. No. 4,282,344. 681 g of a prepolymer (NCO = 3.25%) was cured with 123 g of curing agent. Based on the reported weights and NCO content of the prepolymer the amino nitrogen of the curing agent is calculated to be 5.67% (at 95% stoich.). This amino nitrogen value is close to value calculated without the addition of DOP in step (5). It is also close to the value measured in Example A of this work.
[C]The free MDA content of the curing composition was not reported in U.S. Pat. No. 4,282,344.
[D]It was not possible to measure the free MDA of the curing composition prepared in Comparative Example A because the material was a paste.

Comparative Example B

The following example is repeated from Example 5, Curing Agent A-1/Curing Agent C-1, in U.S. Pat. No. 4,282,344.

A dispersion of 4,4'-methylenedianiline/sodium chloride complex was prepared by: (1) forming a mixture of 217.5 g of di(2-ethylhexyl) phthalate (DOP), 19.5 g of sodium chloride, 64 g of water, 4.35 g of lecithin, 5.8 g of a polyoxypropylated quaternary ammonium chloride; (2) while the resulting mixture was agitated 198 g of methylenedianiline (4,4'-MDA purity content=98.38%) was added; (3) continuing the mixing of the composition at 60° C. until the solid particles of methylenedianiline are consumed; and (4) removing water from the resulting dispersion of complex particles in the organic liquid by distillation in an agitated vessel at 60° C. under reduced pressure. The material produced at the end of step 4 is the dry stage intermediate.

A curing composition is prepared by performing the following additional steps: (5) adding 1.4 parts of an 80/20 mixture of 2,4/2,6-toluene diisocyanate with agitation. The free flowing mixture rapidly turned into a paste, and (6) adding 1.0 part of lecithin to 102.3 parts of the paste formed in step (5), which was blended into the paste using a speed mixer. The results from are shown in Table 2 along with the results from Example 5 (A-1/C-1) of U.S. Pat. No. 4,282,344.

TABLE 2

|  | Report Results for A-1/C-1 U.S. Pat. No. 4,282,344 | Comparative Example B |
|---|---|---|
| Dry Stage Intermediate | | |
| Calculated AN (%) | 6.252 | 6.252 |
| Measured AN (%) | Not Reported | 6.294 |
| Free MDA (%) | 1.6 | 1.905 |
| Viscosity (cP) | Not Reported | 2220 |
| Curing Composition | | |
| Calculated AN (%)[A] | 5.904 | 5.904 |
| Calc. AN from Example 5[B] | 5.814 | — |
| Measured AN (%) | Not Reported | 5.932 |
| Viscosity (cP) | Not Reported | Paste |
| Free MDA (%) | Not Reported[C] | Paste[D] |

[A]U.S. Pat. No. 4,282,344, Example 5-A1-C1, step (5) reports that TDI-80 is added neat and not as a DOP solution.
[B]The curing composition prepared was used to cure a prepolymer in Example 5 of U.S. Pat. 4,282,344. 200 g of a prepolymer (NCO = 6.25%) was cured with 68.1 g of curing agent. Based on the reported weights and NCO content of the prepolymer the amino nitrogen of the curing agent is calculated to be 5.814% (at 95% stoich.). This value is close to the calculated amino nitrogen value and that measured in Comparative Example B.
[C]The free MDA content of the curing composition was not reported.
[D]It was not possible to measure the free MDA of the curing composition prepared in Example B because the material was a paste.

Example 1

A dispersion of 4,4'-methylenedianiline complex was prepared by: (1) forming a mixture of 46.66 pph of di(2-ethylhexyl) phthalate (DOP), 3.85 pph of sodium chloride, 4.02 pph of 25% brine, 0.89 pph of a polyoxypropylated quaternary ammonium chloride; (2) while the resulting mixture was agitated 44.58 pph methylenedianiline (4,4'-MDA content=99.70%) was added; (3) continuing the mixing of the composition at 50° C. until the solid particles of methylenedianiline are consumed; and (4) removing water from the resulting dispersion of complex particles in the organic liquid by distillation in an agitated vessel at 50° C. under reduced pressure. The material produced at the end of step 4 is the dry stage intermediate.

(5) To 100 pph of the dispersion obtained in step (4) was added 8.78 pph of di(2-ethylhexyl) phthalate, 1.05 pph lecithin and 0.46 pph of an 80/20 mixture of 2,4-/2,6-toluene diisocyanate with mixing at 25° C. Mixing was continued for 1 hour. Results are listed in Table 3 below.

Example 2

A dispersion of 4,4'-methylenedianiline complex was prepared by: (1) forming a mixture of 37.40 pph of di(2-ethylhexyl) adipate (DOA), 4.52 pph of sodium chloride, 4.72 pph of 25% brine, 1.05 pph of a polyoxypropylated quaternary ammonium chloride; (2) while the resulting mixture was agitated 52.32 pph methylenedianiline (4,4'-MDA content=99.68%) was added; (3) continuing the mixing of the composition at 50° C. until the solid particles of methylenedianiline are consumed; and (4) removing water from the resulting dispersion of complex particles in the organic liquid by distillation in an agitated vessel at 50° C. under reduced pressure. The material produced at the end of step 4 is the dry stage intermediate.

(5) To 100 pph of the dispersion obtained in step (4) was added 28.88 pph di(2-ethylhexyl) adipate, 1.25 pph lecithin and 0.61 pph of an 80/20 mixture of 2,4-/2,6-toluene diisocyanate with mixing at 25° C. Mixing was continued for 1 hour. The results are listed in Table 3.

TABLE 3

| | Example 1 | Example 2 |
|---|---|---|
| Dry Stage Intermediate | | |
| Calculated AN (%) | 6.490 | 7.660 |
| Measured AN (%) | 6.558 | 7.791 |
| Free MDA (%) | 0.518 | 0.457 |
| Viscosity (cP) | 360 | 195 |
| Curing Composition | | |
| Calculated AN (%) | 5.905 | 5.905 |
| Measured AN (%) | 5.857 | 5.950 |
| Viscosity (cP) | 2055 | 220 |
| Free MDA (ppm) | 560 | 264 |

Examples 1 and 2 demonstrate the surprising and expected results of this invention by producing a low viscosity curing composition with low levels of free MDA. Comparative Examples A and B, which repeated Examples 1 and 5-A-1/C-1 of U.S. Pat. No. 4,282,344, respectively, produce high viscosity pastes. It is not possible to measure the free MDA content on high viscosity pastes of the comparative example because it is not possible to separate the liquid phase for free MDA analysis.

Table 3 demonstrates that using MDA with a high content of the 4,4'-MDA isomer produces a lower level of free MDA in the dry stage intermediate. This is because only the 4,4'-MDA isomer reacts with sodium chloride to form the complex. 2,4'-MDA; 2,2'-MDA; N—$CH_3$-MDA, and other amine containing components do not react to form the complex. The low level of free MDA in the dry stage intermediate of the present invention requires less scavenger, e.g., TDI-80, on a weight basis, be used to form the curing composition. The results suggest that the viscosity of the curing composition is strongly dependent on the amount of TDI-80/MDA reaction product. Examples 1 and 2 demonstrate use of high purity 4,4'-MDA to produce a easily handled, relatively low viscosity curing composition with a low level of free MDA.

Example 3

Curing agents prepared in Examples 1 and 2 are useful in curing prepolymers. Typical prepolymers are shown in Table 4. Each of the prepolymers are available from Chemtura Corporation.

TABLE 4

| # | Prepolymer | Polyol | Isocyanate |
|---|---|---|---|
| 1 | Adiprene ™ L 300 | polyether | TDI |
| 2 | Adiprene ™ LF 950A | polyether | TDI w/low-free TDI |
| 3 | Adiprene ™ LF 1900A | polyester | TDI w/low-free TDI |
| 4 | Adiprene ™ LFM 2450 | polycaprolactone | MDI w/low-free MDI |
| 5 | Adiprene ™ LFM 500 | polyether | MDI w/low-free MDI |
| 6 | Vibrathane ™ 6060 | polycaprolactone | TDI |
| 7 | Vibrathane ™ 8050 | polyester | TDI |
| 8 | Vibrathane ™ 8030 | polycaprolactone | MDI |

Example 4

Each of the curing agents prepared in comparative Examples A and B and Examples 1 and 2 were used to cure prepolymer #1 from Table 4, Adiprene™ L 300.

The procedure used for preparing the cured polyurethane involved heating the prepolymer to 70° C. and mixing in sufficient curing composition to provide 95% of the amino groups required to react with the NCO groups of the prepolymer. The mixtures were poured into molds that were preheated to 100° C. The molds were then heated at 127° C. for two hours for curing and then for 16 hours at 100° C. for post curing. Samples were removed from the molds, die cut (if needed) and conditioned for 7 days at 24° C. and 50% relative humidity before testing. The results are shown in Table 5. Hardness was measured using a Shore A gauge. Tensile properties were measured using ASTM method D-412. Tear resistance was measured using ASTM method D-1938. Compression set was measured using ASTM method D-395-B. Rebound was measured using a Bashore Resiliometer. Compression modulus was measured on the third cycle using ASTM method D-575.

TABLE 5

| | Comparative Example A | Comparative Example B | Example 1 | Example 2 |
|---|---|---|---|---|
| Hardness (Shore A) | 89 | 89 | 91 | 91 |
| 100% Modulus (psi) | 749 | 745 | 1052 | 1021 |
| 300% Modulus (psi) | 1225 | 1205 | 1765 | 1782 |
| Tensile Strength (psi) | 3010 | 2712 | 4394 | 3871 |
| Elongation (%) | 599 | 583 | 458 | 443 |

TABLE 5-continued

|  | Comparative Example A | Comparative Example B | Example 1 | Example 2 |
|---|---|---|---|---|
| Tear Strength (pli) | 62.7 | 63.9 | 84.9 | 69.7 |
| Compression Set (%) | 38 | 39 | 38 | 36 |
| Rebound (%) | 46 | 47 | 51 | 52 |
| 25% Compression Modulus (psi) | 917 | 955 | 1215 | 1152 |

The results in Table 5 shows that the elastomers produced using the curing compositions of the present invention (Examples 1 and 2) have improved physical properties when compared to the curing compositions prepared using procedures listed in the previous art (comparative examples A and B). In particular, 100% modulus, 300% modulus, tensile strength, tear strength and compression modulus showed significant improvements in physical properties.

The results of Examples 1 and 2 shows the utility of the present invention for the preparation of a curing composition that has low-free MDA, low viscosity and improved physical properties when compared to the previous art.

Example 5

A dispersion of 4,4'-methylenedianiline complex was prepared by: (1) forming a mixture of 35.84 pph of di(2-ethylhexyl) adipate (DOA), 9.61 pph of sodium bromide, 3.39 pph of water, 1.00 pph of a polyoxypropylated quaternary ammonium chloride; (2) while the resulting mixture was agitated 50.15 pph methylenedianiline (4,4'-MDA content=99.70%) was added; (3) continuing the mixing of the composition at 50° C. until the solid particles of methylenedianiline are consumed; and (4) removing water from the resulting dispersion of complex particles in the organic liquid by distillation in an agitated vessel at 50° C. under reduced pressure. The material produced at the end of step 4 is the dry stage intermediate.

Example 5A (5) To 100 pph of the dispersion obtained in step (4) was added with mixing 29.00 pph di(2-ethylhexyl) adipate and 0.262 pph of an 80/20 mixture of 2,4-/2,6-toluene diisocyanate 25° C. The composition was mixed for one hour at 25° C. and 1.24 pph lecithin was added. Mixing was continued for 1 hour at 25° C. The results are listed in Table 6.

Example 5B (5) To 100 pph of the dispersion obtained in step (4) was added with mixing 28.67 pph di(2-ethylhexyl) adipate and 0.348 pph of an 80/20 mixture of 2,4-/2,6-toluene diisocyanate 25° C. The composition was mixed for one hour at 25° C. and 1.24 pph lecithin was added. Mixing was continued for 1 hour at 25° C. The results are listed in Table 6.

TABLE 6

|  | Dry Stage Intermediate ||
|---|---|---|
| Calculated AN (%) | 7.331 ||
| Measured AN (%) | 7.240 ||
| Free MDA (%) | 0.198 ||
| Viscosity (cP) | 235 ||
|  | Curing Compositions ||
|  | Example 5A | Example 5B |
| Calculated AN (%) | 5.569 | 5.569 |
| Measured AN (%) | 5.577 | 5.608 |
| Viscosity (cP) | 111 | 124 |
| Free MDA (ppm) | 960 | 865 |

Example 5 demonstrates that a low-free MDA, low viscosity curing composition may be produced by adding TDI-80 and lecithin to a sodium bromide based dry stage intermediate.

Example 6

A dispersion of 4,4'-methylenedianiline complex was prepared by: (1) forming a mixture of 37.40 pph of di(2-ethylhexyl) adipate (DOA), 4.52 pph of sodium chloride, 4.72 pph of 25% brine, 1.05 pph of a polyoxypropylated quaternary ammonium chloride; (2) while the resulting mixture was agitated 52.32 pph methylenedianiline (4,4'-MDA content=99.60%) was added; (3) continuing the mixing of the composition at 50° C. until the solid particles of methylenedianiline are consumed; and (4) removing water from the resulting dispersion of complex particles in the organic liquid by distillation in an agitated vessel at 50° C. under reduced pressure. The material produced at the end of step 4 is the dry stage intermediate.

Example 6A (5) To 100 pph of the dispersion obtained in step (4) was added 28.0 pph di(2-ethylhexyl) adipate and 0.558 pph of an 80/20 mixture of 2,4-/2,6-toluene diisocyanate with mixing at 25° C. Mixing was continued for 4 hours. No surfactants were added. The results are listed in Table 7.

Example 6B (5) To 100 pph of the dispersion obtained in step (4) was added 27.3 pph di(2-ethylhexyl) adipate and 0.738 pph of an 80/20 mixture of 2,4-/2,6-toluene diisocyanate with mixing at 25° C. Mixing was continued for 4 hours. No surfactants were added. The results are listed in Table 7.

TABLE 7

|  | Dry Stage Intermediate ||
|---|---|---|
| Calculated AN (%) | 7.660 ||
| Measured AN (%) | 7.628 ||
| Free MDA (%) | 1.045 ||
| Viscosity (cP) | 216 ||
|  | Curing Compositions ||
|  | Example 6A | Example 6B |
| Calculated AN (%) | 5.905 | 5.905 |
| Measured AN (%) | 5.879 | 5.889 |
| Viscosity (cP) | 1830 | 1850 |
| Free MDA (ppm) | 39.8 | 42.3 |

Example 6 shows the surprising result that it is possible to produce an exceptionally low-free MDA, low viscosity curing composition by adding TDI-80 to the dry stage intermediate in the absence of an oil soluble surfactant. U.S. Pat. No. 4,282,344 states that it is critical to add an oil soluble surfactant to the composition after the addition of the isocyanate. Failure to do so is stated in that patent to result in the composition setting to a paste. Surprisingly and unexpectedly, the elimination of lecithin has the benefit of producing a composition that has a free MDA content that is an order of magnitude lower than compositions that contain lecithin.

What is claimed is:
1. A curing composition comprising:
   an inert liquid carrier comprising a plasticizer selected from the group consisting of esters of polycarboxylic acids and monohydric alcohols or phenols, and esters of polyols and monocarboxylic acids;
   from 30 to 70 wt % based on the total weight of the curing composition of a coordination complex of 4,4'-methylenedianiline and an alkali metal salt selected from the group consisting of sodium chloride, sodium bromide, sodium iodide, lithium chloride, lithium bromide, lithium iodide;

from 0.1 to 5 wt % based on the total weight of the curing composition of one or more surfactants selected from the group consisting of lecithin, polyoxypropylated quaternary ammonium halides, phosphated glycerides; and less than 500 wppm of free methylenedianiline, wherein the curing composition has a Brookfield viscosity of less than 2,500 cP at 30° C. using a #21 spindle wherein said curing composition is obtained by a process comprising, A) adding an initial methylenedianiline to a mixture comprising the alkali metal salt and one or more inert liquid carrier, one or more surfactant and brine or water to form the coordination complex, B) removing water from the mixture comprising the coordination complex to form a dry stage intermediate, C) adding an isocyanate compound to the dry stage intermediate to react with residual methylenedianiline, wherein 99.1% or more of the initial methylenedianiline consists of 4,4'-methylenedianiline and from 0.9% to 0.01% of the initial methylenedianiline is one or more of 2,2'-methylenedianiline, 2,4'-methylenedianiline and N-methyl-4,4'-methylenedianiline, wherein, in the process by which the curing composition is obtained, the initial methylenedianiline in A) is added to a mixture comprising i) an alkali metal salt selected from the group consisting of sodium chloride, sodium bromide, sodium iodide, lithium chloride, lithium bromide, lithium iodide;

ii) one or more inert liquid carrier comprising a plasticizer selected from the group consisting of esters of polycarboxylic acids and monohydric alcohols or phenols, and esters of polyols and monocarboxylic acids;

iii) one or more surfactant selected from the group consisting of lecithin, polyoxypropylated quaternary ammonium halides, and phosphated glycerides:

and iv) brine or water, wherein, in the process by which the curing composition is obtained, no surfactant is added during or after addition of an isocyanate compound to the dry stage intermediate.

2. The curing composition of claim 1, wherein the process by which the curing composition is obtained further comprises adding additional plasticizer selected from the group consisting of esters of polycarboxylic acids and monohydric alcohols or phenols, and esters of polyols and monocarboxylic acids to the dry stage intermediate obtained in B).

3. The curing composition of claim 1, wherein the plasticizer is selected from the group consisting of di(2-ethylhexyl) phthalate, diisodecyl phthalate, di(2-ethylhexyl) adipate, diisodecyl adipate and mixtures thereof.

4. The curing composition of claim 1, wherein the isocyanate compound added to the dry stage intermediate is selected from the group consisting of phenyl isocyanate, p-tolyl isocyanate, cyclohexyl isocyanate, butyl isocyanate, tolylene-2,4-diisocyanate, mixtures of tolylene-2,4-diisocyanate with tolylene-2,6-diisocyanate, 4,4'-methylenebis(phenyl isocyanate), 2,4,4'-triisocyanato-diphenyl ether, phenylene-1,4-diisocyanate, 4,4'-methylenebis(cyclohexyl isocyanate), para-phenylene diisocyanate, 1,6-hexane diisocyanate, isophorone diisocyanate, 3,3'-bitoluene diisocyanate, 1,4-cyclohexyl diisocyanate, and naphthalene-1,5-diisocyanate.

* * * * *